United States Patent
Wood

(10) Patent No.: US 8,696,783 B2
(45) Date of Patent: Apr. 15, 2014

(54) FILTER UNIT

(75) Inventor: Frederick Ian Wood, Warrignton (GB)

(73) Assignee: Nationwide Filter Company (Specialist Products) Limited, Lancashire (GB)

( * ) Notice: Subject to any disclaimer, the term of this patent is extended or adjusted under 35 U.S.C. 154(b) by 0 days.

(21) Appl. No.: 13/093,251

(22) Filed: Apr. 25, 2011

(65) Prior Publication Data

US 2011/0197557 A1 Aug. 18, 2011

Related U.S. Application Data

(63) Continuation of application No. 10/597,917, filed as application No. PCT/GB2005/000555 on Feb. 16, 2005, now abandoned.

(30) Foreign Application Priority Data

Feb. 17, 2004 (GB) .................................. 0403413.8

(51) Int. Cl.
*B01D 46/00* (2006.01)
*B29C 45/14* (2006.01)

(52) U.S. Cl.
USPC .............. 55/502; 55/497; 55/511; 55/DIG. 5; 55/DIG. 31; 264/257; 264/275

(58) Field of Classification Search
USPC ....... 55/497, 500, 502, 511, DIG. 5, DIG. 31; 264/252, 257, 275, 279, 279.1
See application file for complete search history.

(56) References Cited

U.S. PATENT DOCUMENTS

| | | | | |
|---|---|---|---|---|
| 3,815,754 A | * | 6/1974 | Rosenberg | 210/445 |
| 3,869,392 A | * | 3/1975 | Wolf | 210/493.1 |
| 4,187,182 A | * | 2/1980 | Rosenberg | 210/445 |
| 4,373,635 A | * | 2/1983 | Mules | 206/525 |
| 4,746,339 A | | 5/1988 | Millard | |

(Continued)

FOREIGN PATENT DOCUMENTS

| | | |
|---|---|---|
| EP | 0448876 | 10/1991 |
| FR | 2140536 | 1/1973 |

(Continued)

OTHER PUBLICATIONS

Examination Report issued in EP 05717737.0, dated Jun. 16, 2009.

(Continued)

*Primary Examiner* — Robert Clemente
(74) *Attorney, Agent, or Firm* — Woodard, Emhardt, Moriarty, McNett & Henry LLP

(57) ABSTRACT

A method of forming a filter unit comprised of a filter element and an encircling peripheral encasement frame to which the filter element is sealed. The frame is moulded in situ by solidification of a liquid, solidifiable moulding composition (e.g. a curable resin or a matter thermoplastic resin that solidifies on cooling) provided around the periphery of the filter element. The method may comprise the steps of: (i) providing a filter element having front and rear faces and a bounding peripheral edge, (ii) locating around the peripheral edge of the element a mould unit which seals against peripheral regions of the front and rear faces and which together with the peripheral edge defines a mould cavity, (iii) filling the mould cavity with a solidifiable, liquid moulding composition, (iv) effecting conversion of the liquid to a solid, and (v) removing the mould thereby producing the filter element.

16 Claims, 2 Drawing Sheets

(56) References Cited

U.S. PATENT DOCUMENTS

Figure 3:
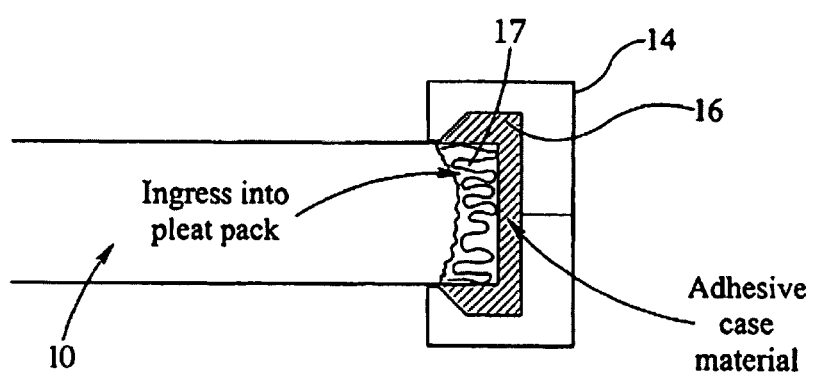

| | | | |
|---|---|---|---|
| 5,308,559 A * | 5/1994 | Baracchi et al. | 264/46.4 |
| 5,512,172 A * | 4/1996 | Marble | 210/232 |
| 5,529,476 A * | 6/1996 | Borasio et al. | 425/116 |
| 5,902,361 A * | 5/1999 | Pomplun et al. | 55/385.3 |
| 6,045,598 A * | 4/2000 | Fath et al. | 55/490 |
| 6,110,243 A | 8/2000 | Wnenchak et al. | |
| 6,162,272 A * | 12/2000 | Michaelis et al. | 55/497 |
| 6,165,403 A * | 12/2000 | Michaelis et al. | 264/261 |
| 6,375,699 B1 * | 4/2002 | Beck | 55/497 |
| 6,379,438 B1 * | 4/2002 | Schneider et al. | 96/154 |
| 6,579,350 B2 * | 6/2003 | Doherty | 96/67 |
| 6,682,683 B2 * | 1/2004 | Michaelis et al. | 264/275 |
| 6,699,348 B2 * | 3/2004 | Hugert et al. | 156/242 |
| 6,726,751 B2 * | 4/2004 | Bause et al. | 96/134 |
| 6,830,443 B1 * | 12/2004 | Coffey et al. | 425/116 |
| 7,070,641 B1 * | 7/2006 | Gunderson et al. | 55/497 |
| 7,341,613 B2 * | 3/2008 | Kirsch | 55/495 |
| 2001/0042361 A1 | 11/2001 | Cox et al. | |
| 2003/0177745 A1 * | 9/2003 | Jauw | 55/497 |
| 2005/0022490 A1 * | 2/2005 | Huang et al. | 55/486 |

FOREIGN PATENT DOCUMENTS

| | | |
|---|---|---|
| GB | 839359 | 6/1960 |
| GB | 2169522 | 6/1986 |
| GB | 2348622 | 10/2000 |
| JP | 60041517 | 3/1985 |
| JP | 63306266 | 12/1988 |
| JP | 02039394 | 2/1990 |
| WO | WO 99/20450 | 4/1999 |

OTHER PUBLICATIONS

Further observations by third party regarding request for opinion regarding GB2411367.

Third party request to UK Intellectual Property Office for opinion regarding GB2411367, dated Feb. 15, 2009.

Translation of FR2140536, published Jan. 19, 1973.

United Kingdom Search report issued in GB0403413.8, dated Feb. 28, 2005.

* cited by examiner

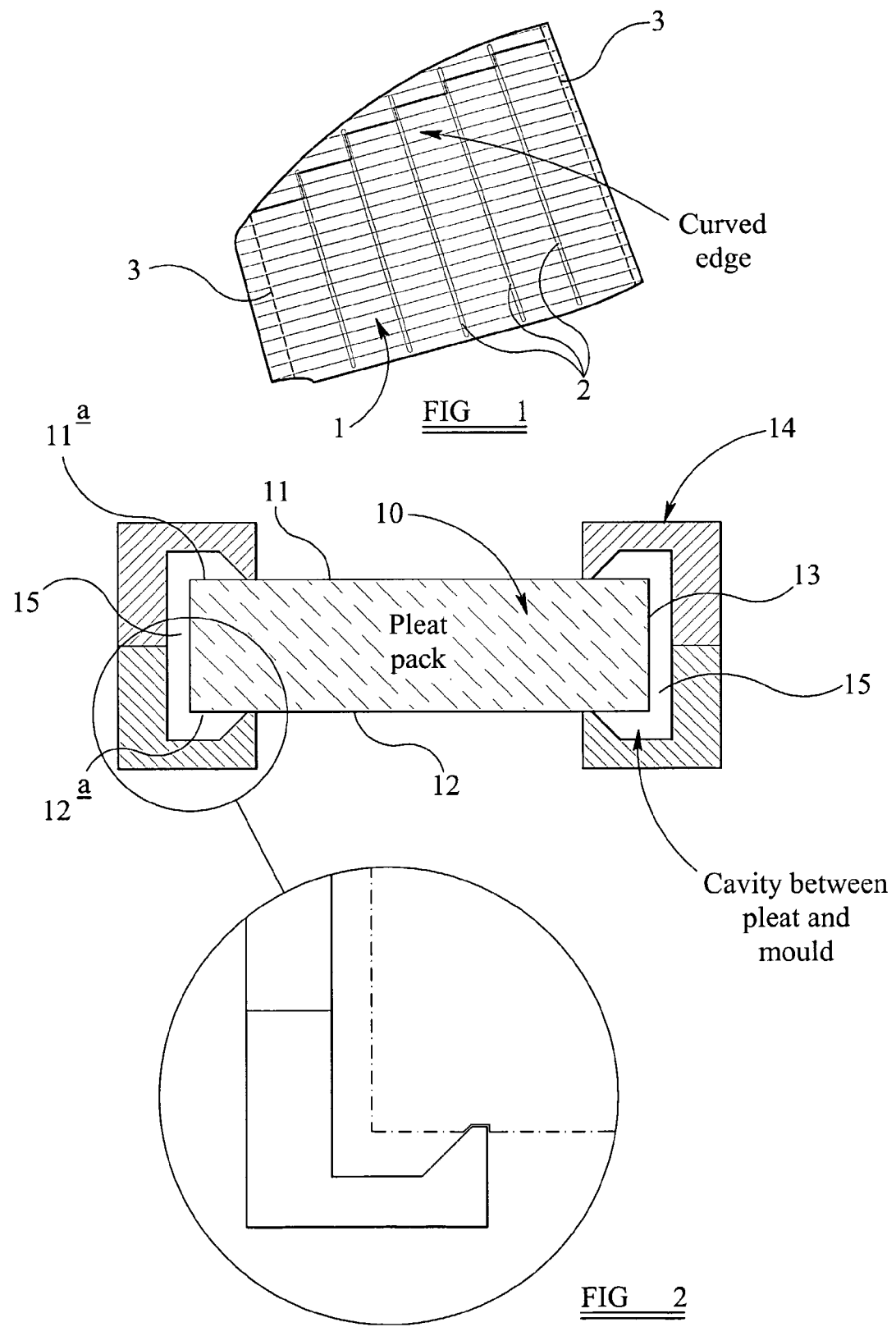

FILTER UNIT

CROSS-REFERENCE TO RELATED APPLICATION

The present application is a continuation of United States Patent Application No. 10/597,917 filed on Aug. 11, 2006, which is a national stage of International Patent Application PCT/GB2005/000555 filed on Feb. 16, 2005 (which was published in English), which claims the benefit of GB 0403413.8 filed Feb. 17, 2004 all of which are hereby incorporated by reference in their entirety.

The present invention relates to filter units.

There are numerous types of filter unit of the type comprising a filter element located in a peripheral encasement frame with there being a seal between the periphery of the filter element and the frame. This seal ensures that all of the fluid to be filtered passes through the filter element itself and does not bypass this element by being able to pass between the periphery thereof and the encasement frame. Examples of filter elements used in such constructions are comprised of fibres, carbon packs, foams, electrostatic felts, meshes, scrims and other flat sheet media.

A particular example of such a filter unit is one incorporating a pleated filter element, such as a H.E.P.A. (High Efficiency Particulate Arrester) filter element. Further examples of filter element include U.L.P.A. (Ultra Low Penetration Air) filters, ASHRAE media.

H.E.P.A. filter units are used in vacuum cleaners, respirators and many other air filtration applications. A H.E.P.A. filter element is pleated and is normally constructed from glass fibre or synthetic filtration sheet media. More particularly, the pleated element is formed by feeding the sheet media from a roll and applying transversely spaced lines of adhesive to the running web, one adjacent each longitudinal edge of the sheet media and usually several lines therebetween (the exact number depending on the width of the sheet media). Subsequently the sheet media is pleated (e.g. using a so-called 'minipleat' machine). In the resulting pleated element, the lines of adhesive serve to bond adjacent leaves of the pleats together.

Subsequently, the pleated element may be cut to shape and then sealed into a close fitting, preformed encasement frame (e.g. of metal or plastics material). Sealing of the pleated element into the frame is perhaps the most important step in the overall process for producing the H.E.P.A. filter unit since, a good seal ensures that all of the air flow passes through the filtration media (with no bypass) so that the efficiency of the filter unit is dictated by the quality of the media and is unaffected by the seal.

However with current technology it is only really practical to produce H.E.P.A. filter units which are either rectangular (which term is also used to mean square) or circular.

In the case of rectangular units, two of the aforementioned glue lines (that bond the pleats together) will be located adjacent (and extend parallel to) two of the side edges of the frame. A sealing composition is then applied around the periphery of the front and rear faces of the pleated element. This composition seals onto the filter element and also onto the encasement frame. The sealing composition must extend sufficiently onto the margin of the filter element to ensure that a good seal is achieved. In particular, the composition extends as far as the outer glue lines (which are parallel to edges of the frame). Thus, in this case, the encasement procedure relies on the glue lines in the pleated pack to effect sealing.

The method used for sealing circular pleated filter elements into encasement frames is somewhat different and is called 'spinning' and does not rely on the glue lines in the pleated pack for the sealing process. More particularly the pleated element (formed as described above) is cut into a circle and placed into a close fitting peripheral encasement frame. The combination of the circular pleated element and the circular frame is then spun at high speed and the sealing composition is applied to the inside of the encasement frame whilst it is spinning. The centripetal force pushes the sealing composition outside onto the case wall where it builds up and seals the circular pleated element into position by 'coating' the open peripheral edges of the pleated pack.

The above described methods for producing rectangular or circular H.E.P.A. filter units are perfectly satisfactory. However difficulty is encountered if it is desired to produce a H.E.P.A. filter unit of other configurations. More particular, if the filtering area of the unit is to be 'maximised' then it is necessary to have a relatively complicated pattern for the sealing composition around the periphery of the unit.

It is therefore an object of the present invention to obviate or mitigate the above mentioned disadvantages.

According to a first aspect of the present invention there is provided a method of forming a filter unit comprised of a filter element and an encircling peripheral encasement frame to which the filter element is sealed wherein the frame is moulded in situ by solidification of a liquid, solidifiable moulding composition provided around the periphery of the filter element.

According to a second aspect of the present invention there is provided a filter unit comprised of a filter element and a peripheral encasement frame sealed to the element wherein the frame has been moulded in situ around the filter element.

By moulding the peripheral encasement frame in situ around the periphery of the filter element from a solidifiable, liquid moulding composition there is produced a frame that is sealed to the filter element. Additionally, it is possible easily to mould encasement frames for filter elements which are other than rectangular or circular.

Preferably the moulding operation produces a frame that partially overlies a marginal region of at least one of the faces of the filter element.

The method of the invention may be effected by the steps of:

(i) providing a filter element having front and rear faces and a bounding peripheral edge, (ii) locating around the peripheral edge of the element a mould unit which seals against peripheral regions of the front and rear faces and which together with the peripheral edge defines a mould cavity, (iii) filling the mould cavity with a solidifiable, liquid moulding composition, (iv) effecting conversion of the liquid to a solid, and (v) removing the mould thereby producing the filter element.

The solidifiable, liquid moulding composition may for example be a curable resin system or a molten thermoplastic resin that solidifies on cooling.

The filter element may, but not necessarily, be a pleated filter element. The invention is applicable particularly to the production of H.E.P.A. filter units but can also be applied to filter units comprising U.L.P.A. (Ultra Low Penetration Air) media, ASHRAE media and synthetic media including ePTFE laminate. The invention can equally well be used for the production of filter units in which the filter element comprises fibres, carbon packs, foams, electrostatic felts, meshes, scrims and other flat sheet media.

The invention has a number of advantages. These include, but are not limited to, the following:

The filter unit can be created in any shape, curved or otherwise on more than one plane.

A pleated filter unit can be created in any shape, curved or otherwise on more than one plane.

The need for manufacture of a separate case for the filter unit is avoided.

The invention enables two or more items to be encapsulated at the same time, e.g. a layer of pleated media and a foam pad.

Layers additional to the filter element may also be assembled with the latter to form a composite unit for encasement by the moulded, peripheral frame.

The invention will be further described by way of example only with reference to the accompanying drawings, in which:

FIG. 1 illustrates an example of a H.E.P.A. filter element of 'irregular' shape;

FIG. 2 schematically illustrates an arrangement for carrying out the method of the invention; and FIG. 3. schematically illustrates formation of the peripheral encasement frame using the arrangement of FIG. 2.

FIG. 1 illustrates a H.E.P.A. filter element 1 formed of a pleated material (e.g. glass fibre or synthetic filtration sheet media) in which the leaves of the adjacent pleats are bonded together by lines of adhesive 2 that extend transversely to the pleats. As illustrated in FIG. 1, the element 1 has three straight edges and a fourth curved edge. Also marked on FIG. 1 by the dashed line 3 is the peripheral region of the element 1 to which sealing composition would need to be applied if the element 1 were to be mounted in a conventional preformed encasement frame (corresponding to the shape of the element 1). It will be seen that, at the curved edge, a step wise application of the sealing composition would be required to ensure adequate sealing whilst maintaining a maximum area of the element 1 free for filtration. The application of such a configuration of sealing composition would be exceedingly difficult using current technology.

Reference is now made to FIG. 2 which illustrates how a peripheral encasement frame may be formed (using the techniques of the invention) by moulding the frame in situ around the peripheral edges of a pleated H.E.P.A. filter element. More particularly, FIG. 2 shows a H.E.P.A. filter element 10 which is considered to have upper and lower (as viewed in FIG. 2) major faces 11 and 12 as well as a peripheral edge 13. A mould 14 is located around the periphery of the filter element 10 and is configured to locate with clearance around the peripheral edge 13 and also around marginal regions 11a and 12a of the upper and lower faces 11 and 12 of the filter element 1. The mould does however have tapering projections 15 that bite slightly into the upper and lower faces 11 and 12 of the filter element so as to cause a slight depression therein (see insert to FIG. 2).

It will be appreciated from the foregoing description that the mould 14 and filter element 10 together form a mould cavity 15 that encircles the pleated element 10. This cavity 15 is defined, on the one hand, by the inner surfaces of the mould 14 and, on the other hand, by the peripheral edge 13 and by marginal regions 11a and 12a of the upper and lower faces of the pleated element 10.

A hardenable liquid composition 16 (see FIG. 3) for forming an encasement frame for the filter element 10 is now introduced into the mould cavity 15 under low pressure and allowed to solidify. The liquid composition may, for example, be a curable resin composition or maybe a molten thermoplastic that is allowed to solidify. As depicted by reference numeral 17, the liquid composition ingresses into the peripheral edge of the element 10.

Once the material has been solidified, the mould may be removed. The resulting product is a filter unit (see FIG. 3) comprising the filter element 10 provided with a peripheral encasing frame sealed to the element 10 (the seal being enhanced due to the aforementioned ingress of material).

It will be appreciated that the above described process allows relatively complex shaped H.E.P.A. filter elements to be encased and sealed effectively. This is useful for aesthetic and ergonomic design of, for example, high efficiency respirator filter masks.

Respirator filters are usually constructed using different layers, each with a specific function. These layers can include pre-filter scrims, pleated media packs, carbon blocks, electro static felts and heat/moisture exchange foam. All of these materials can be incorporated in the mould so that a composite unit is produced.

The illustrated process is also useful for vacuum cleaner design and allows air-flow systems and filters to be produced which are other than rectangular or circular.

The invention claimed is:

1. A method of forming a filter unit comprised of a filter element and an encircling peripheral encasement frame to which the filter element is sealed comprising the steps of:
   (i) providing a filter element having upper and lower faces and a bounding peripheral edge,
   (ii) locating around the peripheral edge of the element a mould unit which seals against peripheral regions of the upper and lower faces and which together with the peripheral edge and marginal regions of the upper and lower faces of the filter element defines a mould cavity,
   (iii) filling the mould cavity with a liquid curable resin system,
   (iv) effecting conversion of the liquid to a solid, and
   (v) removing the mould thereby producing the filter element;
   characterized by said mould unit having tapering projections extending around the entire periphery of the filter element that bite into said peripheral regions of the upper and lower faces so as to cause a slight depression therein.

2. A method as claimed in claim 1 wherein the filter element is pleated.

3. A method as claimed in claim 1 wherein the filter element is a H.E.P.A. filter element.

4. A method as claimed in claim 1 wherein the filter element comprises U.L.P.A. (Ultra Low Penetration Air) media, ASHRAE media or a ePTFE laminate.

5. A method as claimed in claim 1 wherein the filter element comprises a foam, pad or activated carbon.

6. A method as claimed in claim 2 wherein the filter element is a H.E.P.A. filter element.

7. A method as claimed in claim 2 wherein the filter element comprises U.L.P.A. (Ultra Low Penetration Air) media, ASHRAE media or a ePTFE laminate.

8. A method as claimed in claim 7 wherein the filter element is a H.E.P.A. filter element.

9. A method as claimed in claim 2 wherein the filter element comprises a foam, pad or activated carbon.

10. A method as claimed in claim 9 wherein the filter element is a H.E.P.A. filter element.

11. A method as claimed in claim 3 wherein the filter element comprises U.L.P.A. (Ultra Low Penetration Air) media, ASHRAE media or a ePTFE laminate.

12. A method as claimed in claim 3 wherein the filter element comprises a foam, pad or activated carbon.

13. A method as claimed in claim 12 wherein the filter element comprises U.L.P.A. (Ultra Low Penetration Air) media, ASHRAE media or a ePTFE laminate.

14. A method as claimed in claim 4 wherein the filter element comprises a foam, pad or activated carbon.

15. A method as claimed in claim 14 wherein the filter element is pleated.

16. A method as claimed in claim 15 wherein the filter element is a H.E.P.A. filter element.

\* \* \* \* \*